(12) United States Patent
Ling et al.

(10) Patent No.: US 10,953,250 B2
(45) Date of Patent: Mar. 23, 2021

(54) FIRE CONTROL DEVICE FOR POWER STORAGE SYSTEM AND OPERATING METHOD THEREOF

(71) Applicant: INDUSTRIAL TECHNOLOGY RESEARCH INSTITUTE, Hsinchu (TW)

(72) Inventors: Shou-Hung Ling, Taipei (TW); Shih-Hao Liang, New Taipei (TW); Mao-Cheng Huang, Zhubei (TW); Tzi-Cker Chiueh, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 133 days.

(21) Appl. No.: 16/191,718

(22) Filed: Nov. 15, 2018

(65) Prior Publication Data

US 2020/0078623 A1    Mar. 12, 2020

(30) Foreign Application Priority Data

Sep. 12, 2018    (TW) .................................. 107132101

(51) Int. Cl.
*A62C 3/00*    (2006.01)
*A62C 3/16*    (2006.01)
(Continued)

(52) U.S. Cl.
CPC .............. *A62C 3/16* (2013.01); *A62C 35/023* (2013.01); *G06K 9/00624* (2013.01); *G08B 17/10* (2013.01); *H01M 50/572* (2021.01)

(58) Field of Classification Search
CPC .... A62C 3/07; A62C 3/08; A62C 3/10; A62C 3/16; A62C 35/00; A62C 35/02; A62C 37/38; A62C 99/0009
(Continued)

(56) References Cited

U.S. PATENT DOCUMENTS 774,353 A * 11/1904 Galvin ................. A62C 35/605
169/26
1,032,351 A * 7/1912 Easton ................. A62C 35/605
169/26
(Continued)

FOREIGN PATENT DOCUMENTS

CN    102416233 A    4/2012
CN    102722968 A    10/2012
(Continued)

OTHER PUBLICATIONS

Seyed Saeed Madani et al., A review of thermal management and safety for lithium ion batteries, Twelfth International Conference on Ecological Vehicles and Renewable Energies (EVER), 2017.
(Continued)

*Primary Examiner* — Viet Le
(74) *Attorney, Agent, or Firm* — Locke Lord LLP; Tim Tingkang Xia, Esq.

(57) ABSTRACT

A fire control device comprises a box, a power wire, a pressure relieving check valve, a fire extinguishing check valve and a fire extinguisher. The box is configured to accommodate a battery system, and the power wire is configured to couple to the battery system. The pressure relieving check valve and the fire extinguishing check valve extend through the box, and a state of the pressure relieving check valve is switched between open and closed states according to a pressure difference between an inside and an outside of the box. A state of the fire extinguishing check valve is switched between open and close states according to a pressure difference between the inside and the outside of the box. The fire extinguisher is connected to the pressure relieving check valve. The fire extinguisher is switched between starting and stopping modes according to the state of the pressure relieving check valve.

10 Claims, 7 Drawing Sheets

(51) Int. Cl.
*A62C 35/02* (2006.01)
*G06K 9/00* (2006.01)
*G08B 17/10* (2006.01)
*H01M 50/572* (2021.01)

(58) Field of Classification Search
USPC .................................................. 169/19–20, 26
See application file for complete search history.

(56) References Cited

U.S. PATENT DOCUMENTS

| | | | | |
|---|---|---|---|---|
| 1,832,056 A * | 11/1931 | Spencer | .................. | A47G 29/06 169/26 |
| 2,341,382 A * | 2/1944 | Jensen | .................. | H01M 2/043 429/86 |
| 3,119,452 A * | 1/1964 | Sammis | .................. | B64D 13/00 169/26 |
| 3,292,748 A * | 12/1966 | Rifkin | .................. | A45C 3/00 190/119 |
| 3,489,223 A * | 1/1970 | Bundo, Sr. | ............ | A24F 19/145 169/26 |
| 3,536,139 A * | 10/1970 | Bruckner | ............ | A62C 13/003 169/26 |
| 3,924,773 A * | 12/1975 | Wilkinson | ............... | F16K 17/36 220/88.3 |
| 4,013,127 A * | 3/1977 | Tenney | .................... | A62C 3/00 169/57 |
| 4,032,337 A * | 6/1977 | Boyer | ...................... | B22F 3/15 419/49 |
| 4,040,404 A * | 8/1977 | Tagawa | ............ | B60K 15/03519 123/519 |
| 4,411,318 A * | 10/1983 | Zeischegg | ................ | A62C 3/00 169/26 |
| 4,430,396 A * | 2/1984 | Hayes, Jr. | ............... | H01M 2/06 429/184 |
| 5,056,603 A * | 10/1991 | Parkinson | ............. | A62C 3/00 169/26 |
| 5,153,722 A * | 10/1992 | Goedeke | ............. | G08B 17/125 169/61 |
| 5,178,973 A * | 1/1993 | Binder | ................. | H01M 2/1247 429/53 |
| 5,289,275 A * | 2/1994 | Ishii | .................... | G06K 9/00362 340/578 |
| 5,314,027 A * | 5/1994 | Wood | ........................ | A62C 3/06 169/60 |
| 5,390,580 A * | 2/1995 | Gibbons, Jr. | ......... | F41H 5/0457 109/49.5 |
| 5,569,552 A * | 10/1996 | Rao | ..................... | H01M 2/0242 429/120 |
| 5,926,280 A * | 7/1999 | Yamagishi | ............ | G08B 17/125 356/328 |
| 5,980,123 A * | 11/1999 | Heifler | ............. | G08B 13/19608 340/567 |
| 6,271,758 B1 * | 8/2001 | Nakamura | ........... | G08B 17/103 250/564 |
| 6,289,331 B1 * | 9/2001 | Pedersen | ................ | G06Q 10/06 706/60 |
| RE37,804 E * | 7/2002 | Mattan | ................ | H01M 2/0237 429/181 |
| 6,475,660 B1 * | 11/2002 | Misra | .................... | B29C 66/542 429/96 |
| 6,531,847 B1 * | 3/2003 | Tsukamoto | ............ | H01M 10/44 320/135 |
| 6,611,207 B1 * | 8/2003 | Yuan | .................... | G08B 17/125 340/555 |
| 6,828,913 B2 * | 12/2004 | Oppelt | .................... | G01V 8/12 250/573 |
| 6,955,226 B2 * | 10/2005 | Akins | ..................... | G01K 3/00 137/68.12 |
| 7,070,003 B1 * | 7/2006 | Smith | ...................... | A62C 3/00 169/16 |
| 7,176,440 B2 * | 2/2007 | Cofer | .................... | G01B 11/25 250/221 |
| 7,495,573 B2 * | 2/2009 | Tice | ..................... | G08B 17/103 340/628 |
| 7,992,647 B2 * | 8/2011 | Cordani | ................ | A62C 5/033 169/30 |
| 8,462,980 B2 * | 6/2013 | Caballero | .......... | G06K 9/00771 382/100 |
| 8,497,904 B2 * | 7/2013 | Jelinek | ................ | G08B 17/125 348/143 |
| 8,499,560 B2 * | 8/2013 | Gauthier | ................ | F16C 19/52 60/632 |
| 8,544,670 B2 * | 10/2013 | Brilmyer | ............... | H01M 2/127 220/88.1 |
| 8,733,465 B1 * | 5/2014 | Flood | ...................... | A62C 3/16 169/62 |
| 8,745,795 B2 * | 6/2014 | Klancnik | ................ | B32B 5/022 5/698 |
| 8,823,325 B2 * | 9/2014 | Ling | .................... | G01R 31/367 320/132 |
| 8,872,474 B2 * | 10/2014 | Scheucher | .............. | B60L 50/64 320/112 |
| 9,153,846 B2 * | 10/2015 | Liang | ................... | H02J 7/0016 |
| 9,180,324 B2 * | 11/2015 | Burkett | .................... | A62C 3/00 |
| 9,229,510 B2 * | 1/2016 | Chiueh | .................. | H01M 10/42 |
| 9,339,671 B1 * | 5/2016 | Raj | ......................... | A62C 3/16 |
| 9,466,991 B2 * | 10/2016 | Ling | ...................... | B60L 53/22 |
| 9,522,291 B2 * | 12/2016 | Fukuhara | ............ | A62C 99/0045 |
| 9,539,448 B2 * | 1/2017 | Jung | .................... | H01M 10/48 |
| 9,586,067 B1 * | 3/2017 | Kirkbride | ............... | A62C 13/62 |
| 9,768,477 B2 * | 9/2017 | Fukuhara | .............. | H01M 10/482 |
| 9,939,298 B2 * | 4/2018 | Gordon | .................. | F17C 13/025 |
| 9,943,715 B2 * | 4/2018 | Cordani | ................ | A62D 1/0064 |
| 10,052,508 B2 * | 8/2018 | Hariram | ................... | B60K 1/04 |
| 10,183,781 B2 * | 1/2019 | Parque | .................... | B65D 27/20 |
| 10,304,306 B2 * | 5/2019 | Mills | ..................... | G06K 9/6202 |
| 10,328,295 B2 * | 6/2019 | Cordani | ............. | A62B 35/0037 |
| 10,395,498 B2 * | 8/2019 | Mills | ................... | G06K 9/00771 |
| 10,463,897 B2 * | 11/2019 | Dedina | .................. | A62C 35/026 |
| 2001/0055712 A1 * | 12/2001 | Cittanova | .......... | A62C 99/0018 429/61 |
| 2002/0135490 A1 * | 9/2002 | Opitz | .................... | G08B 17/125 340/628 |
| 2003/0062175 A1 * | 4/2003 | Olander | ................ | A62C 35/023 169/51 |
| 2004/0185339 A1 * | 9/2004 | Jones | .................... | H01M 10/484 429/177 |
| 2004/0226726 A1 * | 11/2004 | Holland | ................ | A62C 13/22 169/62 |
| 2005/0046584 A1 * | 3/2005 | Breed | .................... | B60N 2/0232 340/13.31 |
| 2005/0100193 A1 * | 5/2005 | Privalov | ............... | G08B 17/103 382/103 |
| 2006/0021762 A1 * | 2/2006 | Golinveaux | ........... | A62C 35/60 169/17 |
| 2006/0202847 A1 * | 9/2006 | Oppelt | ................ | G08B 17/125 340/630 |
| 2006/0209184 A1 * | 9/2006 | Chen | .................... | G08B 29/186 348/61 |
| 2007/0006939 A1 * | 1/2007 | Clusserath | ............ | B67C 3/2628 141/40 |
| 2008/0053770 A1 * | 3/2008 | Tynyk | ................. | H01M 2/1066 190/100 |
| 2008/0289837 A1 * | 11/2008 | Rouosseau | ............ | A62C 13/006 169/88 |
| 2009/0288713 A1 * | 11/2009 | Hirakata | ................ | F17C 13/026 137/14 |
| 2010/0305883 A1 * | 12/2010 | Danzy | .................... | F16K 17/04 702/50 |
| 2011/0127049 A1 * | 6/2011 | Long | ................... | F16K 31/1635 169/16 |
| 2011/0250477 A1 * | 10/2011 | Yoshida | ................ | B60L 3/0053 429/61 |
| 2011/0297402 A1 * | 12/2011 | Belmonte | ............ | A62C 35/10 169/56 |
| 2013/0011701 A1 * | 1/2013 | Petzinger | ............ | H01M 10/643 429/48 |

(56) References Cited

U.S. PATENT DOCUMENTS

| | | | | |
|---|---|---|---|---|
| 2013/0146603 | A1* | 6/2013 | Brilmyer | H01M 2/1094 220/560.01 |
| 2014/0186668 | A1* | 7/2014 | Jung | H01M 10/4207 429/61 |
| 2015/0034287 | A1* | 2/2015 | Otto | F28F 3/12 165/168 |
| 2015/0053274 | A1* | 2/2015 | Gordon | F17C 13/025 137/14 |
| 2016/0074686 | A1* | 3/2016 | Taniguchi | A62C 35/10 169/9 |
| 2016/0134146 | A1* | 5/2016 | Ling | H01M 10/44 320/136 |
| 2016/0164315 | A1* | 6/2016 | Hsu | H02J 7/0024 320/128 |
| 2016/0195196 | A1* | 7/2016 | Ringer | F16K 31/52408 169/19 |
| 2017/0133865 | A1* | 5/2017 | Chiueh | H02J 7/0068 |
| 2018/0123371 | A1* | 5/2018 | Liang | H01M 10/425 |

FOREIGN PATENT DOCUMENTS

| | | |
|---|---|---|
| CN | 104124410 A | 10/2014 |
| CN | 104502208 A | 4/2015 |
| CN | 204543337 U | 8/2015 |
| CN | 105056456 A | 11/2015 |
| CN | 106571503 A | 4/2017 |
| CN | 106684499 A | 5/2017 |
| CN | 206492126 U | 9/2017 |
| CN | 107749446 A | 3/2018 |
| CN | 207583016 U | 7/2018 |
| EP | 2848557 A2 | 3/2015 |
| JP | 2017004959 A | 1/2017 |
| TW | 201714639 A | 5/2017 |
| TW | 201814950 A | 4/2018 |
| WO | 2010025761 A1 | 3/2010 |
| WO | 2013036087 A2 | 3/2013 |
| WO | 2017143748 A1 | 8/2017 |
| WO | 2017213132 A1 | 12/2017 |

OTHER PUBLICATIONS

Jim McDowall et al., Industrial lithium ion battery safety—What are the tradeoffs?, INTELEC 07—29th International Telecommunications Energy Conference, 2007.

Vijay Somandepalli et al., Thermal safety management of lithium-ion battery energy storage systems for use in ocean-going and subsea applications, Occeans, 2015.

David A. White et al., Safety & reliability capabilities of Lithium-Ion battery systems for subsea applications that use autonomous Lithium-Ion battery modules, Oceans, 2013.

Chao Zhang et al., Energy storage system: Current studies on batteries and power condition system, Renewable and Sustainable Energy Reviews, 2018, 82, 3091-3106.

M.A. Hannan et al., Review of energy storage systems for electric vehicle applications: Issues and challenges, Renewable and Sustainable Energy Reviews, 2017, 69, 771-789.

Taiwan Patent Office, "Office Action", dated Feb. 22, 2019, Taiwan.
European Patent Office, "Partial European Search Report for 18205000.5", The Hague, dated May 6, 2019.
Jhao, Jhen-Yu, Introduction to New Energy Vehicle Technology, Jan. 31, 2016.
Syu, Guang-Jyu, Vehicle power transmission technology, Mar. 31, 2018.
Siao, Ming, Application of Transformer, Mar. 31, 2013.
China Patent Office, "Office Action", dated Aug. 28, 2020, China.

* cited by examiner

FIRE CONTROL DEVICE FOR POWER STORAGE SYSTEM AND OPERATING METHOD THEREOF

CROSS-REFERENCE TO RELATED APPLICATIONS

This non-provisional application claims priority under 35 U.S.C. § 119(a) on Patent Application No(s). 107132101 filed in Republic of China on Sep. 12, 2018, the entire contents of which are hereby incorporated by reference.

BACKGROUND

1. Technical Field

This disclosure relates to a fire control device for a power storage system and an operating method thereof.

2. Related Art

There are many pollutants in the air, one of which is suspended particle floating in the air. Because the suspended particle is too small, it is very harmful to a human's lung. Among them, the fuel scooters and electric vehicles are a source of suspended particles. In order to reduce the content of suspended particles to improve air quality, many companies need to develop various types of electric scooters and electric vehicles. When the power of electric scooters or electric vehicles is exhausted, it must go to the charging station for charging, so the popularization of the power storage system is an important trend for a city's development Small power storage systems are usually installed in a chassis, while large power storage systems are usually placed in the factory. When a power storage system is on fire due to its damage, a current fire-fighting treatment procedure must be carried out by at least one personnel in a fire region. However, since the power storage system is on fire, except that personnel may injured when performing a fire-fighting work, the power storage system may produce poisonous gases or smokes, which not only obscure the sight of the personnel but also impair the fire-fighting work, which results in the inability to quickly reduce the damage of the power storage system, and poisonous gases or smokes may also cause harm to the human's body.

In view of the foregoing situations, there is a need for an improved fire control device for a power storage system, which can improve above shortcomings.

SUMMARY

Accordingly, this disclosure provides a fire control device for a power storage system and an operating method thereof. In addition to reducing damages caused by the power storage system is on fire, the fire control device can also provide appropriate protections during a fire-fighting process.

According to one or more embodiment of this disclosure, a fire control device for a power storage system is provided, and the fire control device comprises a box, a power wire, a pressure relieving check valve, a fire extinguishing check valve and a fire extinguisher. The box is configured to accommodate a battery system, a power receiving end of the power wire is configured to couple to the battery system, and a power output end of the power wire is outside the box. The pressure relieving check valve extends through the box, and a first input end and a first output end of the pressure relieving check valve are respectively located outside the box and inside the box, and a state of the pressure relieving check valve is switch between a first open state and a first closed state according to a pressure difference between the inside and the outside of the box. The fire extinguishing check valve extends through the box, and a second input end and a second output end of the fire extinguishing check valve are respectively located outside and inside the box. A state of the fire extinguishing check valve is switched between a second open state and a second closed state according to a pressure difference between the inside and the outside of the box. The fire extinguisher is disposed in the box and is connected to the pressure relieving check valve. The fire extinguisher is switched between a starting mode and a stopping mode according to the state of the pressure relieving check valve.

According to one or more embodiment of this disclosure, an operating method of a fire control device for a power storage system is provided, and the operating method is performed by the fire control device. The fire control system includes a box, a battery system mounted in the box, a power wire connected with the box and the battery system respectively, a fire extinguisher mounted in the box, and an image recognition assembly, the operating method comprises: determining an environmental state in the box by the image recognition assembly; starting the fire extinguisher by the image recognition assembly when the environmental state in the box belongs to a first environmental state; and re-executing determining the environmental state in the box by the image recognition assembly when the environmental state in the box is a second environmental state.

In view of the above description, since the battery system placed in a sealed accommodating space inside the box is on fire, the box can isolate personnel from a fire region to avoid direct injury to the personnel. On the other hand, when a pressure inside the box is greater than a pressure outside the box due to the battery system on fire, the pressure relieving check valve is triggered to switch from the closed state to the open state to achieve a purpose of relieving pressure, thereby avoiding the box from exploding due to an excessive gas pressure inside the box. In addition, when the pressure relieving check valve is in the open state, the fire extinguisher is started synchronously by the pressure relieving check valve to reduce a temperature inside the box. Except avoiding the battery system from suffering more serious damages, the personnel do not need to directly enter into the fire region to ensure the safety of personnel. On the other hand, the image recognition assembly can be used as a standby fire detection setting. When the pressure relieving check valve fails, the image recognition assembly can also achieve the fire extinguishing effect because it also has the function of starting the fire extinguisher.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 5 is a flowchart of an operating method for the fire control device shown in

FIG. 4;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
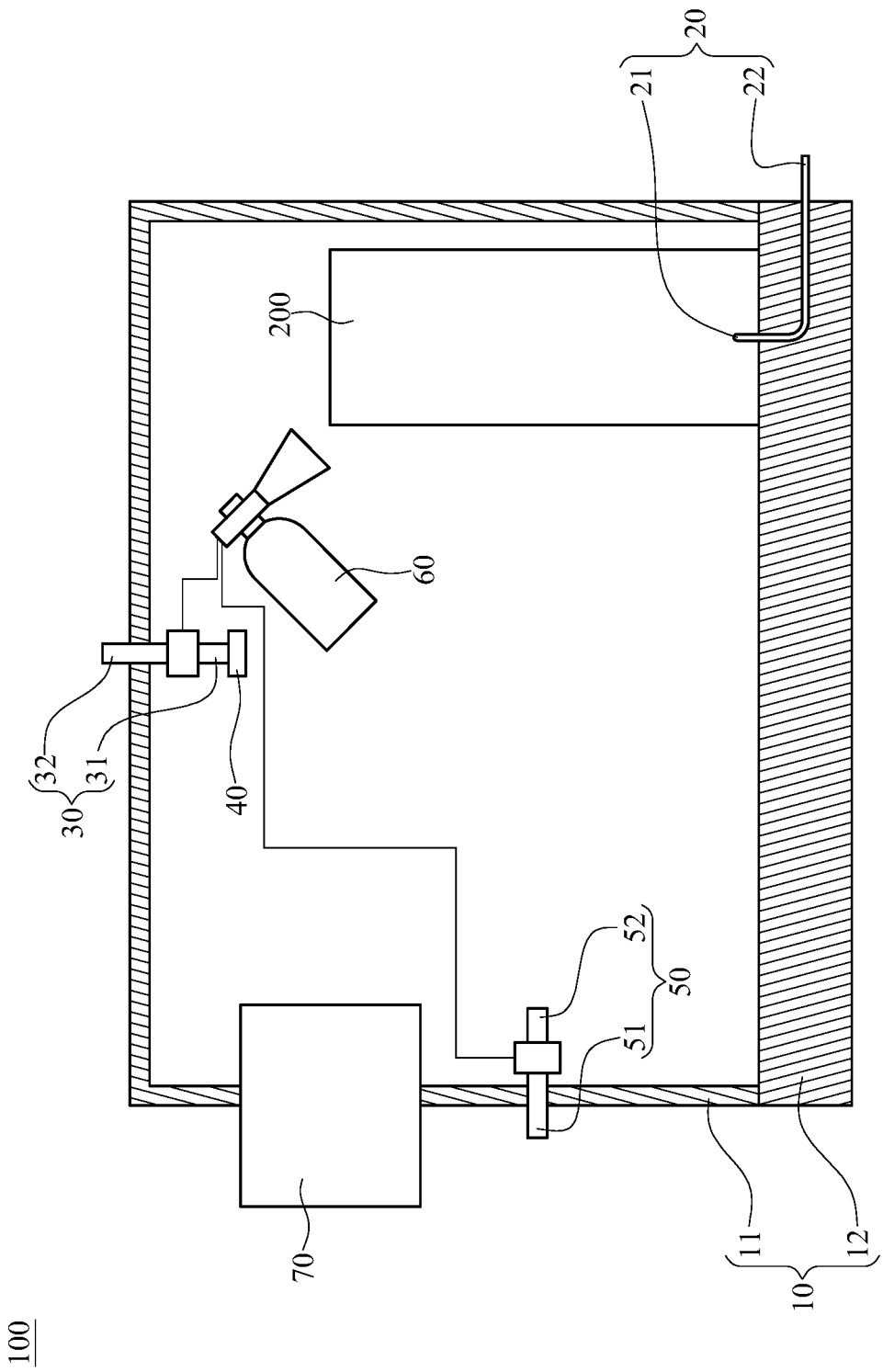
FIG. 1 is a schematic view of a fire control device for a power storage system according to the first embodiment of the present disclosure.

FIG. 1 is a schematic view of a fire control device for a power storage system according to the first embodiment of the present disclosure. As shown in FIG. 1, the fire control device 100 may comprise a box 10, a power wire 20, a pressure relieving check valve 30, an air filter 40, a fire extinguishing check valve 50, a fire extinguisher 60 and a heat exchanger 70.

A size of the box 10 is not limited. In one embodiment, the size of the box 10 may be similar to a server cabinet whose size is between 0.6 meter to 1.2 meter. In other embodiments, the size of the box 10 may be similar to a size of a factory building. In this embodiment, the box 10 may include a housing 11 and a base 12, a material of the housing 11 may be a transparent or non-transparent insulating material to avoid electric shock, and the housing 11 may be detachably assembled with the base 12. A sealed accommodating space is formed by the housing 11 after the pressure relieving check valve 30, the fire extinguishing check valve 50 and the heat exchanger 70 are assembled with the housing 11. An interior of the housing 11 is configured to accommodate a battery system 200, and the battery system 200 may exemplary a battery system adapted for a server, an electric scooter, or an electric car.

An exterior of the power wire 20 is covered with an insulating tape and has a power receiving end 21 and a power output end 22. The power receiving end 21 may be electrically connected with the battery system 200 in the box 10, the power wire 20 may extend through the base 12. The power output end 22 extends out of the box 10 for electrically connecting to an external device requiring charging.

In one embodiment, the box 10 may be mounted on a floor or a wall. When the box 10 is mounted on the floor, the housing 11 is detachably assembled to the floor to form a sealed space, which means the base 12 is used as a floor. In another embodiment, when the box 10 is mounted on the wall, the fire control device 100 can be rotated with 90 degrees, and the housing 11 can be detachably assembled to the wall to form a sealed space, which means the base 12 is used as a wall.

In this embodiment, the pressure relieving check valve 30 may extend through a top of the housing 11. In another embodiment, the pressure relieving check valve 30 may extend through a wall thickness of any wall of the housing 11 according to position arrangements of the battery system 200 and the fire extinguisher 60 in the box 10. In addition, the number of the pressure relieving check valve 30 may be single or plural. The pressure relieving check valve 30 has a first input end 31 and a first output end 32, the first input end 31 is located in the housing 11, and the first output end 32 is located outside the housing 11. The state of the pressure relieving check valve 30 can be switched between an open state (also referred to as a first open state) and a closed state (also referred to as a first closed state) according to a pressure difference between the inside and the outside of the housing 11. When the pressure inside the housing 11 is greater than the pressure outside the housing 11, the pressure relieving check valve 30 is in the open state so that the air in the housing 11 can flow out of the housing 11 via the pressure relieving check valve 30. When the pressure inside the housing 11 is less than the pressure outside the housing 11, the pressure relieving check valve 30 is in the closed state so that the air inside the housing 11 can't flow out of the housing 11. The pressure relieving check valve 30 is normally in the closed state, and when the battery system 200 is overheated or get on fire due to its damage, the temperature of the air inside the housing 11 is raised by the heat convection. According to the gas reaction volume law, since the inside of the housing 11 is a sealed space, the volume of air in the housing 11 remains unchanged. When the temperature of the air inside the housing 11 rises, the air pressure inside the housing 11 is relatively increased. When the air pressure in the housing 11 is greater than the air pressure outside the housing 11, the pressure relieving check valve 30 is switched from the closed state to the open state, thereby releasing the gas pressure in the housing 11 to avoid the housing 11 from explosion causing more serious damage to the battery system 200 due to an excessive gas pressure in the housing 11.

The air filter 40 is connected with the first input end 31 of the pressure relieving check valve 30. In one embodiment, the air filter 40 may be composed of a fan and an air strainer, and the type of the air filter may include a high efficiency air strainer, an electrostatic strainer or an activated carbon strainer. In other embodiments, the air filter 40 can be a nano photo catalyst. Since the battery system 200 may generate fine aerosols, toxic gases or smoke when it is on fire. When the pressure relieving check valve 30 is in the open state, the air filter 40 may first filter out fine aerosols, toxic gases or smoke, so that there is no harmful substance in the gas flowing out of the pressure relieving check valve 30. Therefore, the pressure relieving check valve 30 and the air filter 40 can provide appropriate protection for personnel.

The fire extinguishing check valve 50 may extend through a wall thickness of a wall of the housing 11 and has a second input end 51 and a second output end 52. The second input end 51 is located outside the housing 11, and the second output end 52 is located in the housing 11, and the state of the fire extinguishing check valve 50 can be switched to an open state (also referred to as a second open state) and a closed state (also referred to as a second closed state) according to the pressure difference between the inside and the outside of the housing 11. The number of fire extinguishing check valve 50 may also be single or plural. The fire extinguishing check valve 50 is normally in the closed state. When a fire occurs in the box 10, a person can align an external fire extinguisher with the second input end 51 of the fire extinguishing check valve 50 and start up the external fire extinguisher. When the pressure generated by fire extinguishing substances sprayed by the external fire extinguisher is greater than the pressure inside the housing 11, the fire extinguishing check valve 50 can be switched from the closed state to the open state. In this way, even if personnel are located outside the box 10, the personnel can extinguish the fire in the box 10 through the fire extinguishing check valve 50, the safety of the personnel is ensured simultaneously. In one embodiment, for ease of using the fire extinguishing check valve 50, the height of the fire extinguishing check valve 50 mounted on the housing 10 is the height of a typical adult.

The fire extinguisher 60 is disposed in the housing 11 and can be fixed to the base 12 or detachably assembled to the base 12. The number of fire extinguishers 60 may be single or plural depending on the size of the box 10 or the specification of the battery system 200, and the fire extinguisher 60 may be connected with at least one of the pressure relieving check valve 30 and the fire extinguishing check valve 50. In one embodiment, the fire extinguisher 60 can be connected with the pressure relieving check valve 30 and/or the fire extinguishing check valve 50 by a solenoid valve respectively. When at least one of the pressure relieving check valve 30 and the fire extinguishing check valve 50 is switched from the closed state to the open state, the solenoid valve can be triggered simultaneously to cause the fire extinguisher 60 to switch from a stopping mode to a starting mode. In detail, the pressure relieving check valve 30 in the open state causes the fire extinguisher 60 to operate in the starting mode, the fire extinguishing check valve 50 in the open state causes the fire extinguisher 60 to operate in the starting mode, and the fire extinguisher 60 operating in the starting mode can erupt fire extinguishing substances toward the box 10. In other embodiments, each of the pressure relieving check valve 30, the fire extinguishing check valve 50, and the fire extinguisher 60 may be provided with a wireless communication device, and the state of at least one of the pressure relieving check valve 30 and the fire extinguishing check valve 50 is switched from the closed state to the open state, the wireless trigger signal transmitted by the wireless communication device may drive the fire extinguisher 60 to switch from the stopping mode to the starting mode. Therefore, the fire control device 100 not only provides personnel to extinguish the fire outside the box 10, but also the fire extinguisher 60 in the box 10 may be automatically triggered to erupt fire extinguishing substances, thereby improving fire extinguishing efficiency to reduce the damage degree of the battery system 200.

Figure 2:
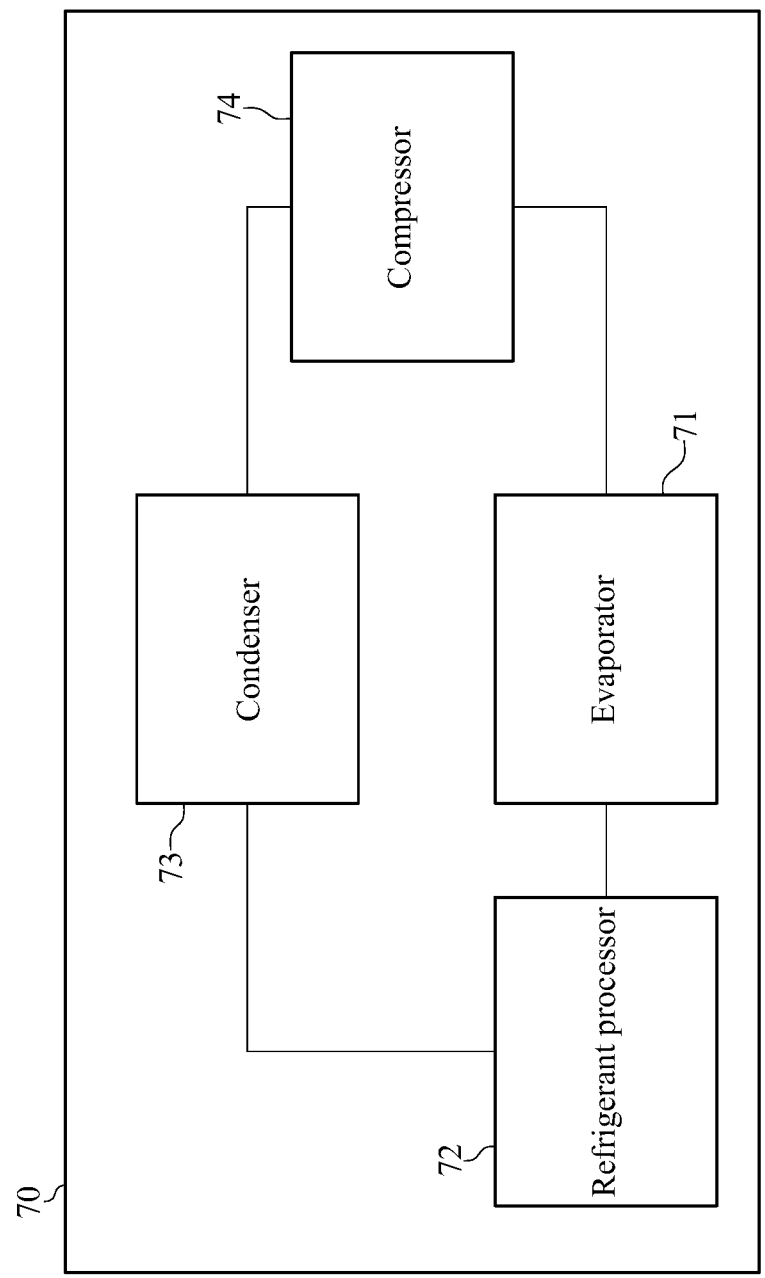
FIG. 2 is a schematic view of a heat exchanger of the fire control device shown in FIG. 1.

FIG. 2 is a schematic view of a heat exchanger of the fire control device shown in FIG. 1. In conjunction with FIG. 1 and FIG. 2, the heat exchanger 70 is connected with the housing 11 of the box 10, and the heat exchanger 70 includes an evaporator 71, a refrigerant processor 72, a condenser 73, and a compressor 74. The evaporator 71 and the condenser 73 are respectively disposed inside and outside the box 10, and the condenser 73 is connected with the refrigerant processor 72 and the compressor 74 respectively. A capillary is connected between the refrigerant processor 72 and the evaporator 71, and the compressor 74 is connected with the evaporator 71 and the condenser 73 respectively. The evaporator 71, the refrigerant processor 72, the condenser 73, and the compressor 74 constitute a closed loop system. The refrigerant provided by the refrigerant processor 72 is repeatedly switched between a gas phase and a liquid phase to circulate in the closed loop system, and the refrigerant is, exemplary carbon dioxide, chlorofluorocarbons or hydro chlorofluorocarbons. When the temperature in the box 10 rises, the compressor 74 can be triggered to operate, and the refrigerant with a low temperature and a low pressure is converted into an overheated vapor with a high temperature and a high pressure by the compressor 74. Then the refrigerant at the overheated vapor state in the condenser 73 exchanges heat with the outside of the box 10 to form a liquid having a normal temperature and a high pressure. Then the refrigerant at a liquid state with a normal temperature and a high pressure is expanded by the capillary to form a wet steam with a low temperature and a low pressure. Then the refrigerant at a wet vapor state with a low temperature and a low pressure in the evaporator 71 exchanges heat with the inside of the box 10 to absorb heat in the box 10, thereby lowering the temperature in the box 10.

Figure 3:
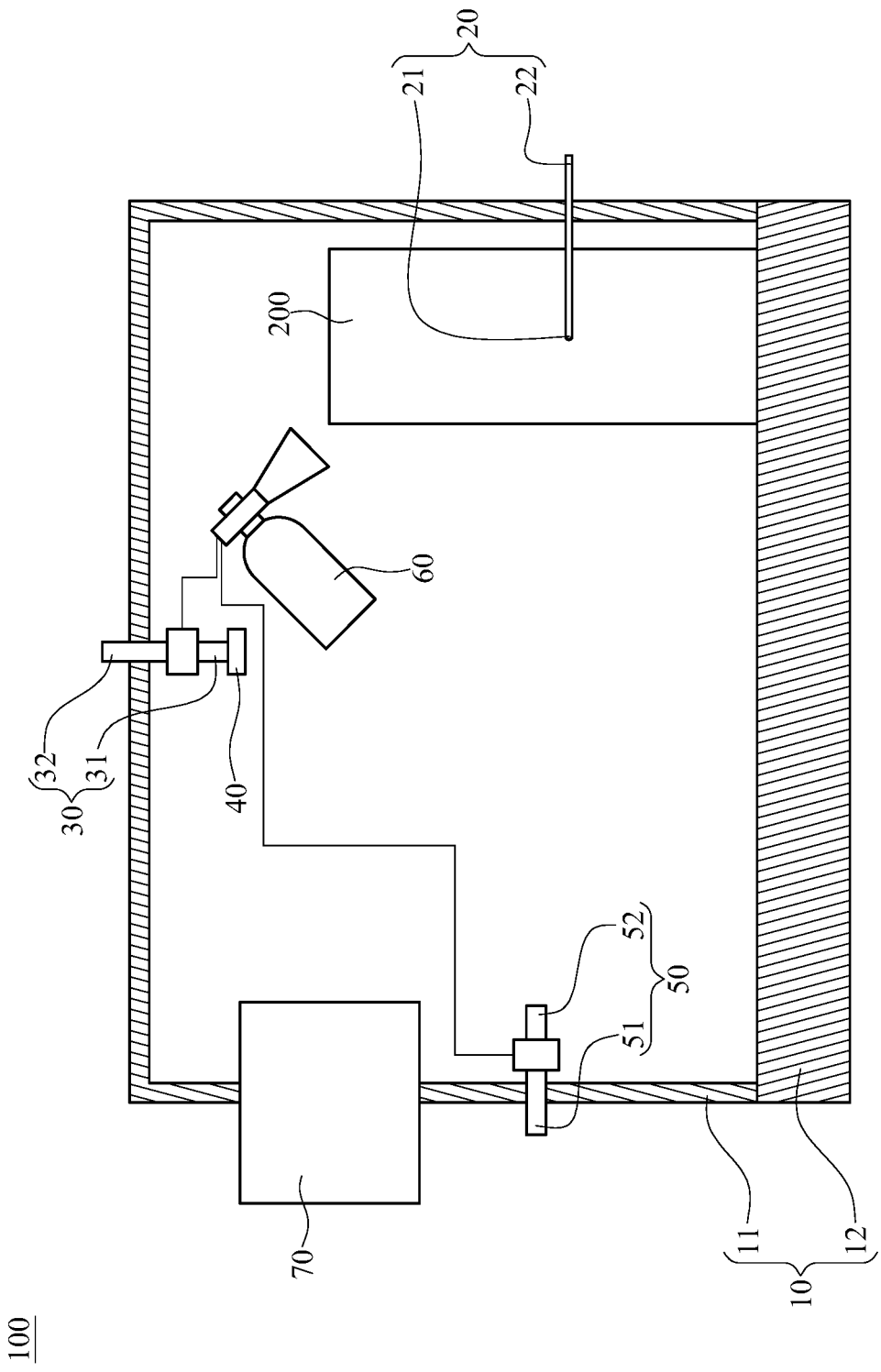
FIG. 3 is a schematic view of a fire control device for a power storage system according to the second embodiment of the present disclosure.

FIG. 3 is a schematic view of a fire control device for a power storage system according to the second embodiment of the present disclosure. The difference between the embodiment of FIG. 3 and the embodiment of FIG. 1 is that the power wire 20 extends through a wall thickness of a wall of the housing 11, wherein the power receiving end 21 of the power wire 20 is electrically connected with the battery system 200 in the housing 11, and the power output end 22 of the power wire 20 extends out of the housing 11, and the power output end 22 can be configured to electrically connect with an external device that requires charging.

Figure 4:
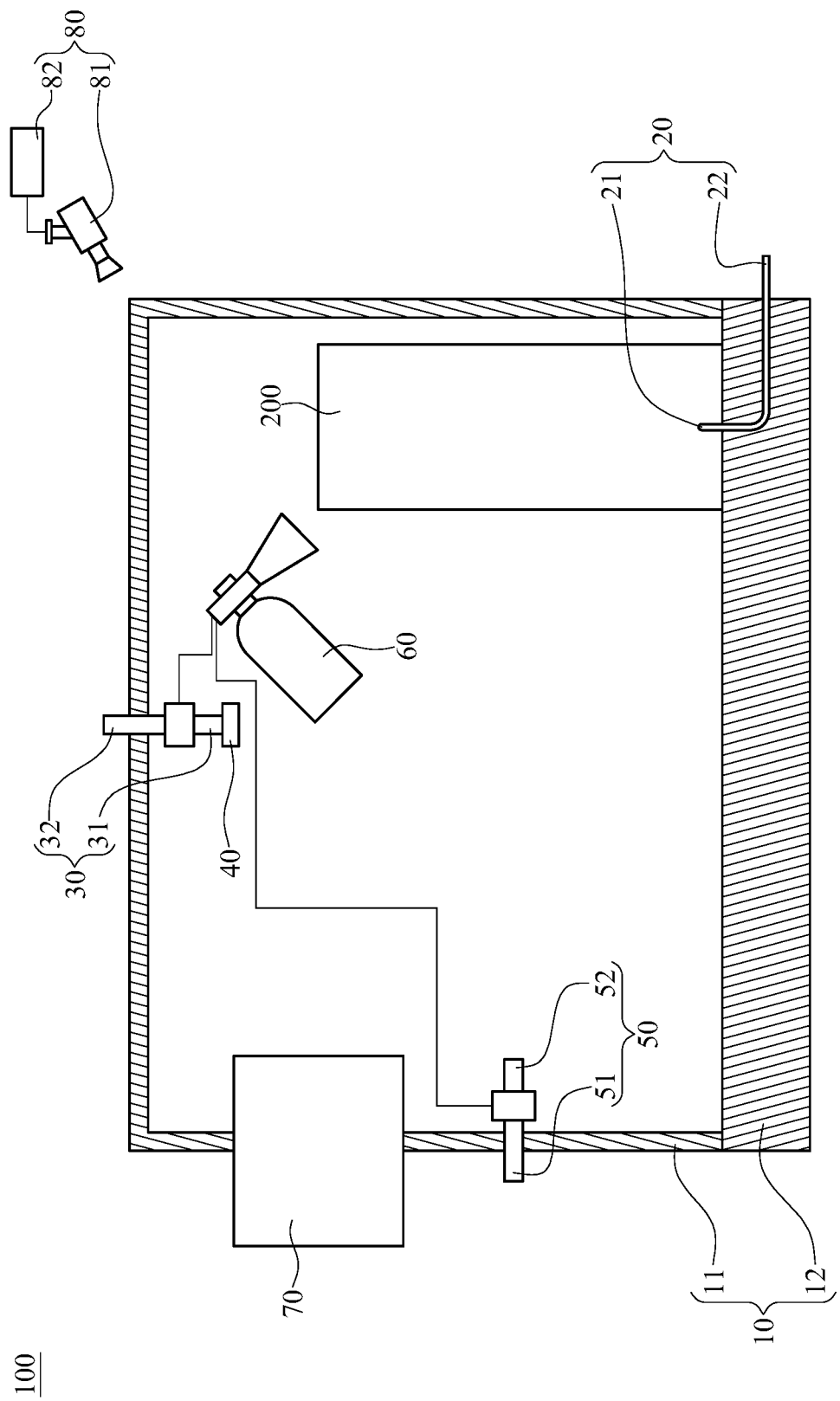
FIG. 4 is a schematic view of a fire control device for a power storage system according to the third embodiment of the present disclosure.

FIG. 4 is a schematic view of a fire control device for a power storage system according to the third embodiment of the present disclosure. As shown in FIG. 4, the fire control device 100 further comprises an image recognition assembly 80, and the image recognition assembly 80 is disposed outside the box 10. In this embodiment, the image recognition assembly 80 includes an image capturing device 81 and a processor 82 coupled to the image capturing device 81. The material of the housing 11 is a transparent insulating material, and the image capturing device 81 is configured to capture the image inside the housing 11. The processor 82 determines the environmental state in the housing 11 according to the image captured by the image capturing device 81. The processor 82 and the fire extinguisher 60 are respectively provided with wireless communication devices, and the processor 82 is communicatively connected with the fire extinguisher 60 by the wireless communication devices. The processor 82 determines whether to output a wireless trigger signal to drive the fire extinguisher 60 to be switched from the stopping mode to starting mode according to the environmental state in the housing 11. When the battery system 200 in the housing 11 generates smokes because the battery system 200 is on fire, but the pressure in the housing 11 is not greater than the pressure outside the housing 11 so that the pressure relieving check valve 30 is not switched from the closed state to the open state, therefore the pressure relieving check valve 30 does not trigger the fire extinguisher 60 in the housing 11 and the state of the fire extinguisher 60 maintains at the stopping mode. With the aid of the image recognition assembly 80, it is possible to detect smoke, a spark or flames in the housing 11 in advance and trigger the fire extinguisher 60 to be switched from the stopping state to the starting state, so as to extinguish the fire in the housing 11 before the fire expands, and reduce the damage of the battery system 200. Except the foregoing situations, the pressure relieving check valve 30 can't relief the pressure in the box 10 due to its malfunction. At this time, the image recognition assembly 80 acts as a backup fire detection device and can also drive the fire extinguisher 60 to extinguish the fire. In another embodiment, the pressure relieving check valve 30 and the image recognition assembly 80 can operate simultaneously, and the pressure relieving check valve 30 or the image recognition assembly 80 can trigger the fire extinguisher 60 to extinguish the fire.

In other embodiments, the image recognition assembly 80 can be an infrared camera. In this case, the material of the housing 11 does not have to be a transparent material, and the housing 11 can also be made by a non-transparent material.

Figure 5:
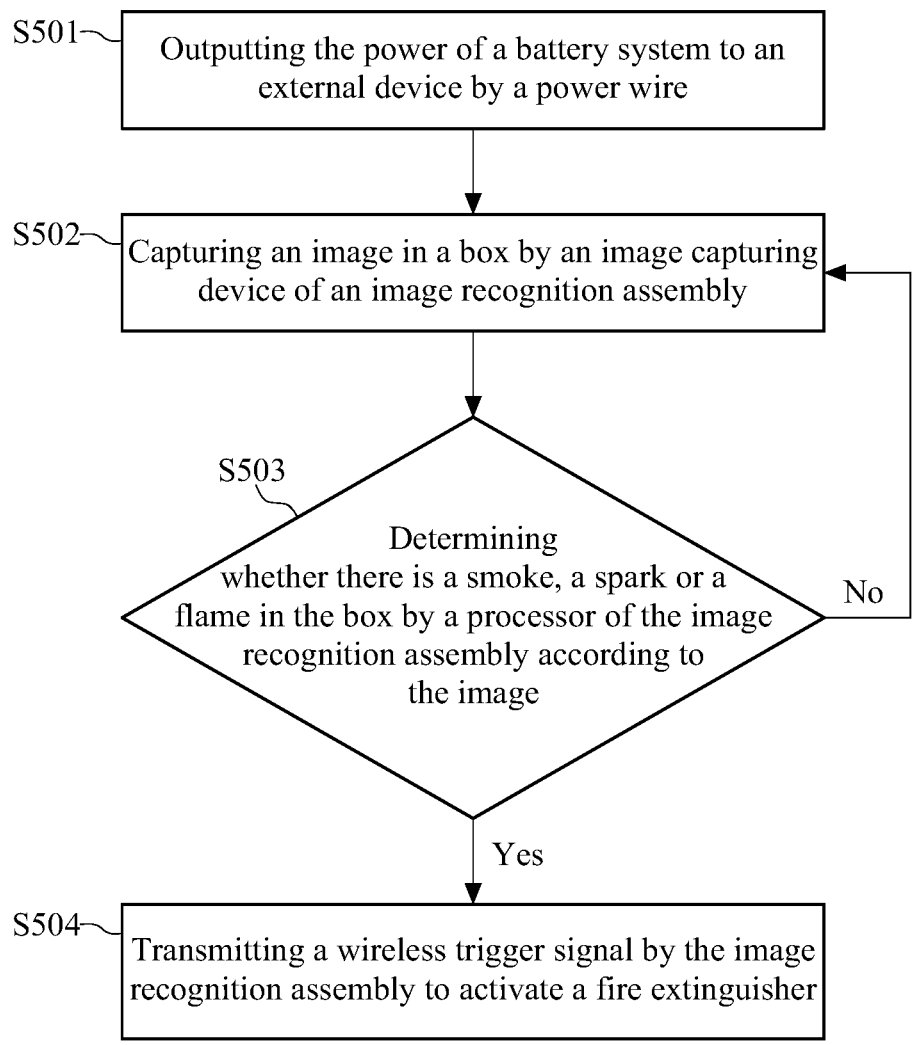

FIG. 5 is a flowchart of an operating method for the fire control device shown in FIG. 4. Referring to FIG. 4 and FIG. 5 together, in step S501, outputting the power of the battery system 200 to an external device that requires power by the power wire 20. In step S502, capturing an image in the box 10 by the image capturing device 81 of the image recognition assembly 80. In step S503, determining an environmental state in the box 10 by the processor 82 of the image recognition assembly 80 according to the image captured by the image capturing device 81. In this embodiment, determining the environmental state in the box 10 by the image recognition assembly 80 means determining whether there is smoke, a spark or flames in the box 10. When the image recognition assembly 80 determines that there is smoke, a spark or flames in the box 10, the environmental state in the box 10 is a first environmental state. When the image recognition assembly 80 determines that there is no smoke, spark and flame in the box 10, the environmental state in the box 10 is a second environmental state. In other embodiments, the first environmental state indicates that the battery system 200 in the box 10 is on fire, and the second environmental state indicates that the battery system 200 in the box 10 is not on fire. When the image recognition assembly 80 determines that there is smoke, a spark or flames in the box 10, step S504 is performed. If the image recognition assembly 80 determines that there is no smoke, spark and flame in the box 10, the process returns to step S502. In step S504, transmitting a wireless trigger signal by the image recognition assembly 80 to activate the fire extinguisher 60. In other embodiments, step S501 can be omitted.

Figure 6:
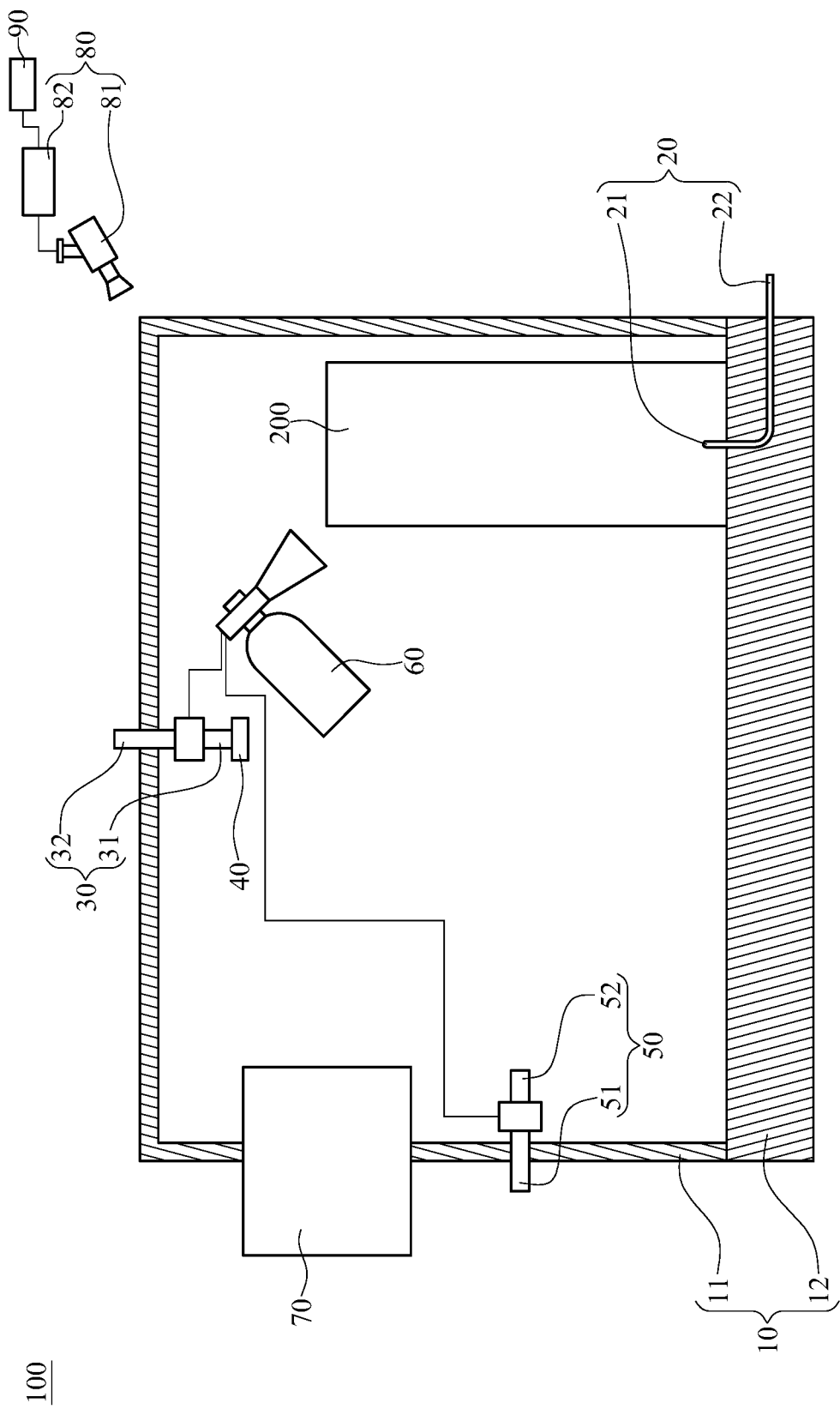
FIG. 6 is a schematic view of a fire control device for a power storage system according to the fourth embodiment of the present disclosure.

FIG. 6 is a schematic view of a fire control device for a power storage system according to the fourth embodiment of the present disclosure. The difference between the embodiment of FIG. 6 and the embodiment of FIG. 4 is that the fire control device 100 further comprises an alarm device 90, and the alarm device 90 is electrically connected with the processor 82 of the image recognition assembly 80. The processor 82 of the image recognition assembly 80 determines whether to activate the alarm device 90 according to an environmental state in the box 10. In this embodiment, when the image recognition assembly 80 determines that there is smoke, a spark or flames in the box 10, the processor 82 activates the alarm device 90, and the alarm device 90 can directly send out an alarm signal after it is activated by the processor 82. For example, the alarm signal may be a warning light or a siren with a specific frequency. In other embodiments, the alarm device 90 is further connectable to a network. When the alarm device 90 is activated by the image recognition assembly 80, the alarm device 90 can send out an alarm signal to an external server via the network. For example, the external server may be a computer in a fire station.

Figure 7:
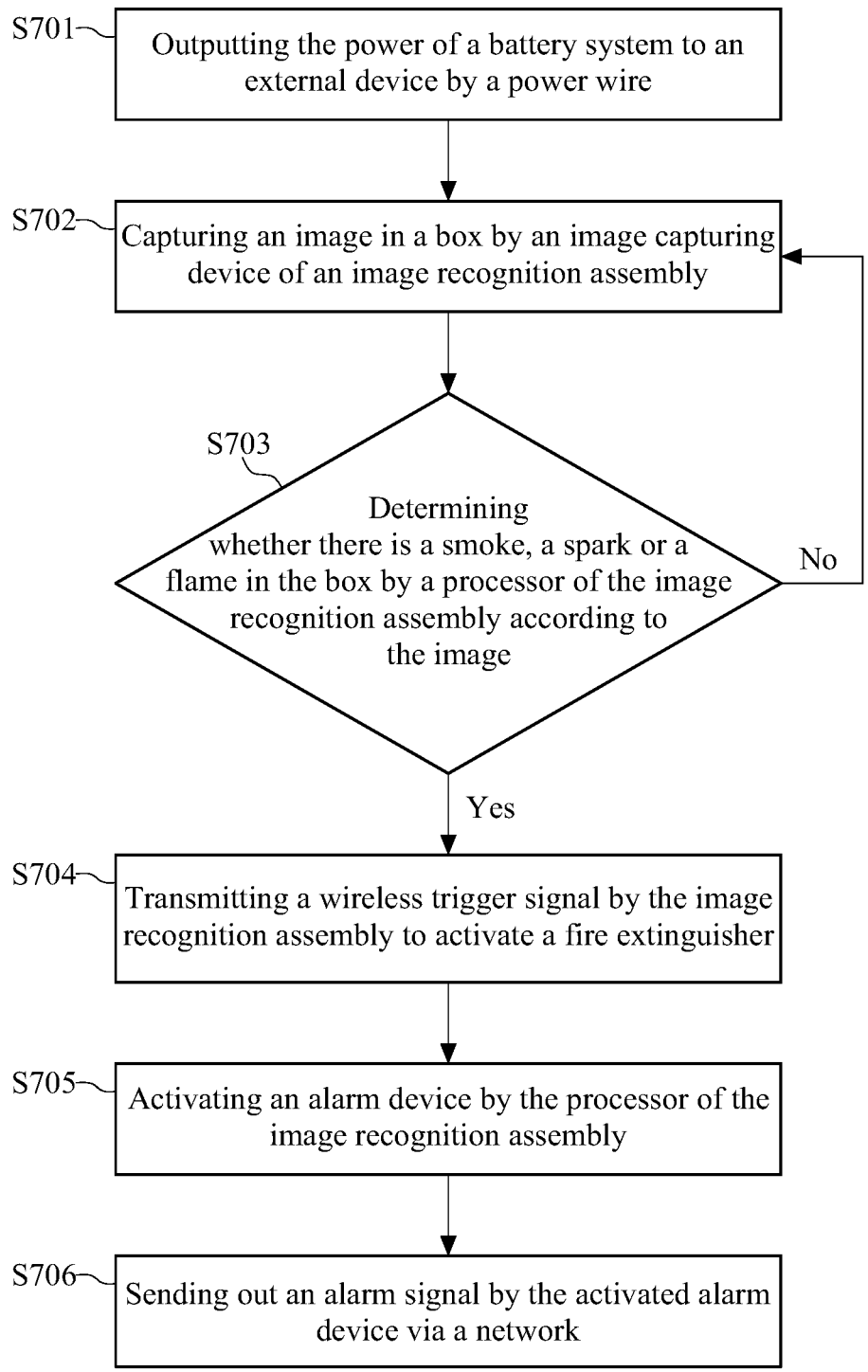
FIG. 7 is a flowchart of an operating method for the fire control device shown in FIG. 6.

FIG. 7 is a flowchart of an operating method for the fire control device shown in FIG. 6. Referring to FIG. 6 and FIG. 7 together, step S701 is outputting the power of the battery system 200 to an external device that requires power by the power wire 20. In step S702, capturing an image in the box 10 by the image capturing device 81 of the image recognition assembly 80 is performed. Step S703 is determining whether there is smoke, a spark or flames in the box 10 by the processor 82 of the image recognition assembly 80 according to the image captured by the image capturing device 81. When the image recognition assembly 80 determines that there is smoke, a spark or flames in the box 10, step S704 is performed. If the image recognition assembly 80 determines that there is no smoke, spark and flame in the box 10, the process returns to step S702. In step S704, transmitting a wireless trigger signal by the image recognition assembly 80 to activate the fire extinguisher 60 is performed. In step S705, activating the alarm device 90 by the processor 82 of the image recognition assembly 80 is performed. Step S706 is sending out an alarm signal by the activated alarm device 90 via a network. In other embodiments, step S701 can be omitted.

In view of the above description, since the battery system placed in a sealed accommodating space inside the box is on fire, the box can isolate personnel from a fire region to avoid direct injury to the personnel. On the other hand, when a pressure inside the box is greater than a pressure outside the box due to the battery system on fire, the pressure relieving check valve is triggered to switch from the closed state to the open state to achieve a purpose of relieving pressure, thereby avoiding the box from exploding due to an excessive gas pressure inside the box. In addition, when the pressure relieving check valve is in the open state, the fire extinguisher is started synchronously by the pressure relieving check valve to reduce a temperature inside the box. Except avoiding the battery system from suffering more serious damages, the personnel do not need to directly enter into the fire region to ensure the safety of personnel. On the other hand, the image recognition assembly can be used as a standby fire detection setting. When the pressure relieving check valve fails, the image recognition assembly can also achieve the fire extinguishing effect because it also has the function of starting the fire extinguisher.

What is claimed is:

1. A fire control device for a power storage system, comprising:
    a box configured to accommodate a battery system;
    a power wire connected with the box and having a power receiving end and a power output end, wherein the power receiving end is configured to couple to the battery system and the power output end is outside the box;
    a pressure relieving check valve extending through a wall thickness of the box and having a first input end and a first output end, wherein the first input end is located inside the box and the first output end is located outside the box, a state of the pressure relieving check valve is switched between a first open state and a first closed state according to a pressure difference between an inside of the box and an outside of the box;
    a fire extinguishing check valve extending through the wall thickness of the box and having a second input end and a second output end, wherein the second input end is located outside the box and the second output end is located inside the box, a state of the fire extinguishing check valve is switched between a second open state and a second closed state according to the pressure difference between the inside of the box and the outside of the box; and
    a fire extinguisher disposed in the box and connected to the pressure relieving check valve and the fire extinguishing check valve, wherein the fire extinguisher is driven to switch from a stopping mode to a starting mode when the state of the pressure relieving check valve is switched from the first closed state to the first open state, the pressure relieving check valve is in the first open state when a pressure inside the box is greater than a pressure outside the box, the fire extinguisher is driven to switch from the stopping mode to the starting mode when the state of the fire extinguishing check valve is switched from the second closed state to the second open state, and the fire extinguishing check valve is in the second open state when the pressure inside the box is less than an external pressure provided to the fire extinguishing check valve.

2. The fire control device in claim 1, wherein the box includes a housing and a base, the housing is assembled with the base, and a sealed accommodating space is formed by the housing.

3. The fire control device in claim 2, wherein the housing is a transparent housing.

4. The fire control device in claim 2, wherein the power wire extends through the base.

5. The fire control device in claim 1, further comprising an air filter connected with the first input end of the pressure relieving check valve.

6. The fire control device in claim 5, further comprising a heat exchanger connected to the box.

7. The fire control device in claim 1, further comprising an image recognition assembly mounted outside the box and communicatively connected with the fire extinguisher, wherein the image recognition assembly determines whether to drive the fire extinguisher according to an environmental state in the box.

8. The fire control device in claim 7, wherein the image recognition assembly includes an image capturing device and a processor, the image capturing device captures an image in the box, the processor is coupled to the image capturing device and determines the environmental state in the box according to the image.

9. The fire control device in claim 7, wherein the image recognition assembly is further coupled to an alarm device, and the image recognition assembly determines whether to activate the alarm device according to the environmental state in the box.

10. The fire control device in claim 9, wherein the alarm device is further connected to a network, and the alarm device sends out an alarm signal by the network when the alarm device is activated by the image recognition assembly.

* * * * *